United States Patent

[11] 3,554,323

| [72] | Inventor | Lee A. Wheelock |
| | | 233 Glenullen, Pasadena, Calif. 91105 |
| [21] | Appl. No. | 794,466 |
| [22] | Filed | Dec. 16, 1968 |
| [45] | Patented | Jan. 12, 1971 |

[54] APPARATUS FOR AUTOMATIC LUBRICATION OF CHAIN LINK CONVEYORS
11 Claims, 3 Drawing Figs.

[52] U.S. Cl. ............................................. 184/15, 137/98
[51] Int. Cl. ....................................... F16n 13/16, F16n 7/14
[50] Field of Search .......................................... 184/15, 15A, 6; 137/99, 98

[56] References Cited
UNITED STATES PATENTS

| 2,203,832 | 6/1940 | Malburg ...................... | 137/99 |
| 2,887,094 | 5/1959 | Krukemeier .................. | 137/99UX |
| 3,023,848 | 3/1962 | Osterman .................... | 184/15 |
| 3,116,810 | 1/1964 | Olson ........................... | 184/15 |
| 3,148,747 | 9/1964 | Batchelor .................... | 184/15 |
| 3,171,510 | 3/1965 | Olsen et al. ................. | 184/15 |

FOREIGN PATENTS

| 949,339 | 2/1964 | Great Britain ............... | 184/15 |

*Primary Examiner*—Manuel A. Antonakas
*Attorney*—Rolf M. Pitts

ABSTRACT: Apparatus for automatic lubrication of a chain link type conveyor, comprising an adjustable fluid pressure driven mixing pump responsive to a pressurized source of water and coupled to a source of water miscible lubricant for providing an output mixture of lubricant and water of a preselected ratio by volume. A pair of conical spray type nozzles, each having an aperture of substantially 0.015 inch, are coupled to the pump output by chemically inert piping and are located and oriented downwardly over a respective chain-to-be-lubricated. Shutoff valve means, responsive to conveyor motion, shuts off the fluid circuit of the lubricating apparatus when the conveyor is stopped.

INVENTOR.
LEE A. WHEELOCK
ATTORNEY

INVENTOR.
LEE A. WHEELOCK

APPARATUS FOR AUTOMATIC LUBRICATION OF CHAIN LINK CONVEYORS

BACKGROUND OF THE INVENTION

In the food processing industry and in other mass production processing industries, conveyor belts and the like are employed to transport product packages and elements of products-to-be-processed from station to station, where the different steps comprising the process are performed. Downtime of the conveyors, due to wear and tear thereof or damage thereto, is very costly in terms of consequential loss of plant production, and possible product spoilage, as well as the incidental cost of repairs. Accordingly, good plant management practices require the implementation of preventative maintenance practices directed toward reducing the likelihood and extent of such wearout and downtime.

In those plants employing chain link type conveyors, such preventative maintenance practices have been directed toward the lubrication of the load-bearing surfaces of the chains comprising the conveyor system. Such lubrication has been sought in the prior art by the application of water-miscible lubricants, referred to in the art as "soap." Mixtures of water and "soap" are applied to the equipment for random intervals of time based on judgment or observation or on a noninterference basis with other activities of a human operator, resulting in uneven and inefficient application of such lubricants, and unnecessary waste. The slippery conditions resulting from the foaming and running over of such material, due to inattentiveness and waste, further constitute hazards to safe working conditions for factory personnel.

Although pumping devices have been available in the fluid materials-handling art, such devices have not been applied to efficiently and economically effect such lubrication function.

SUMMARY OF THE INVENTION

By means of the concept of the subject invention, automatic lubrication is provided for a chain link type conveyor, whereby efficient and economical use of the water-miscible lubricant is achieved.

In a preferred embodiment of the invention, there is provided an adjustable, fluid-pressure driven mixing pump responsive to a pressurized source of water and coupled to a source of a water miscible lubricant for providing an output mixture of lubricant and water of a preselected ratio by volume. A pair of conical spray type nozzles, each having an aperture of at least 0.015 inches, are coupled to the output of the mixing pump by chemically inert piping, and are located and oriented downwardly over a respective chain-to-be-lubricated. Shutoff valve means, response to conveyor motion, shuts off the fluid circuit of the lubrication apparatus when the actuator is stopped.

Thus, in normal operation of the above-described arrangement, an appropriate amount of lubricant is automatically metered and provided, while stoppage of the conveyor results in stoppage of the lubrication, whereby inefficiency, waste and environmental hazards attendant with such waste are avoided. Accordingly, it is an object of the invention to provide means for improved lubrication of chain link type conveyors.

It is another object of the invention to provide means for automatic lubrication of chain link type conveyors.

It is a further object to provide an automatic lubrication system of increased efficiency and economy.

These and other objects of the invention will become apparent from the following description, taken together with the accompanying drawings, in which:

BRIEF DESCRIPTION OF THE DRAWINGS

In the FIGS. like reference characters refer to like parts.

DESCRIPTION OF THE PREFERRED EMBODIMENTS

Figure 1:
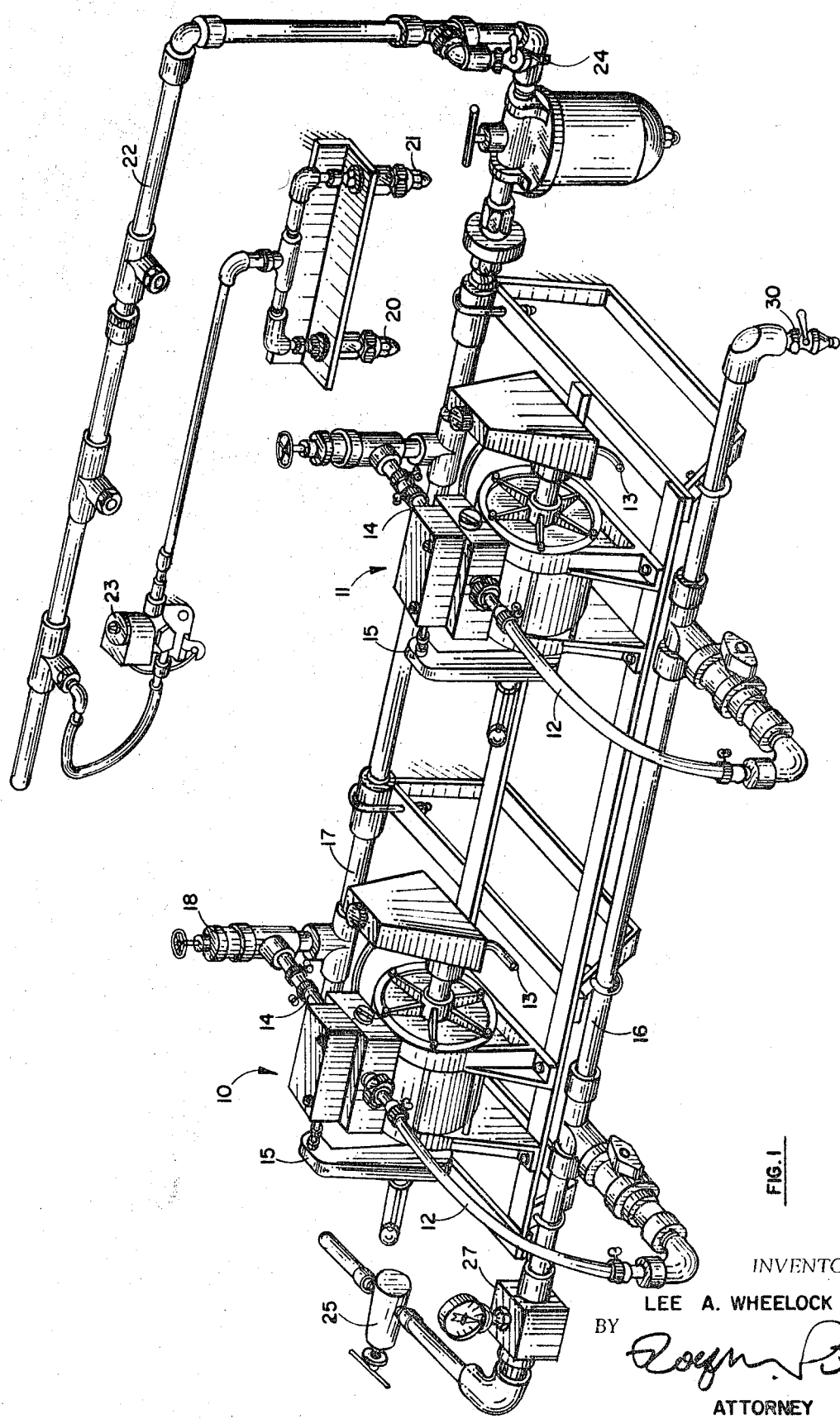
FIG. 1 is a perspective view of an exemplary arrangement of a system embodying the inventive concept.

Referring now to FIG. 1, there is illustrated a perspective view of an exemplary arrangement of a system embodying the inventive concept. There is provided apparatus for automatic lubrication of a chain link type conveyor and comprising two adjustable fluid pressure driven mixing pumps or fluid proportioners 10 and 11, each having a first input 12 and a second input 13 adapted to be coupled to a respective one of a pressurized source of water (not shown) and source (not shown) of a water-miscible lubricant for providing an output mixture of lubricant and water of a selected ratio by volume and corresponding to a preselected titration reading. Each of proportioning pumps 10 and 11 is of a type driven by the fluid flow therethrough of the pressurized water applied to input port 12 and escaping at port 14, to pump a second fluid (water-miscible lubricant) from a second input port 13 to the output port 14. The proportion of lubricant mixed with the pressurized water is varied by adjustment of the proportioner linkage 15. Proportioning pumps 10 and 11 are known in the art, a suitable version being commercially available for example from the Pennsalt Company of Pittsburgh, Pennsylvania.

In the arrangement of FIG. 1, proportioning pumps 10 and 11 are shown side by side and adapted for alternative operation, one pump being kept in a standby arrangement. The first or pressure-driven input 12 of each pump is commonly connected to an input manifold 16, adapted to be connected to a pressurized source of soft water, and the output port of each pump is connected to a common output manifold 17 by a manually operated shutoff valve 18. Opening of the valve 18 associated with a given pump allows the pressurized water to flow through the pump, thus effecting pumping and mixing (e.g., proportioning) of the lubricant. By shutting off the valve, the water flow ceases (even though the water pressure is still applied to the pump), whereby the pump is placed in a standby mode.

Figure 3:
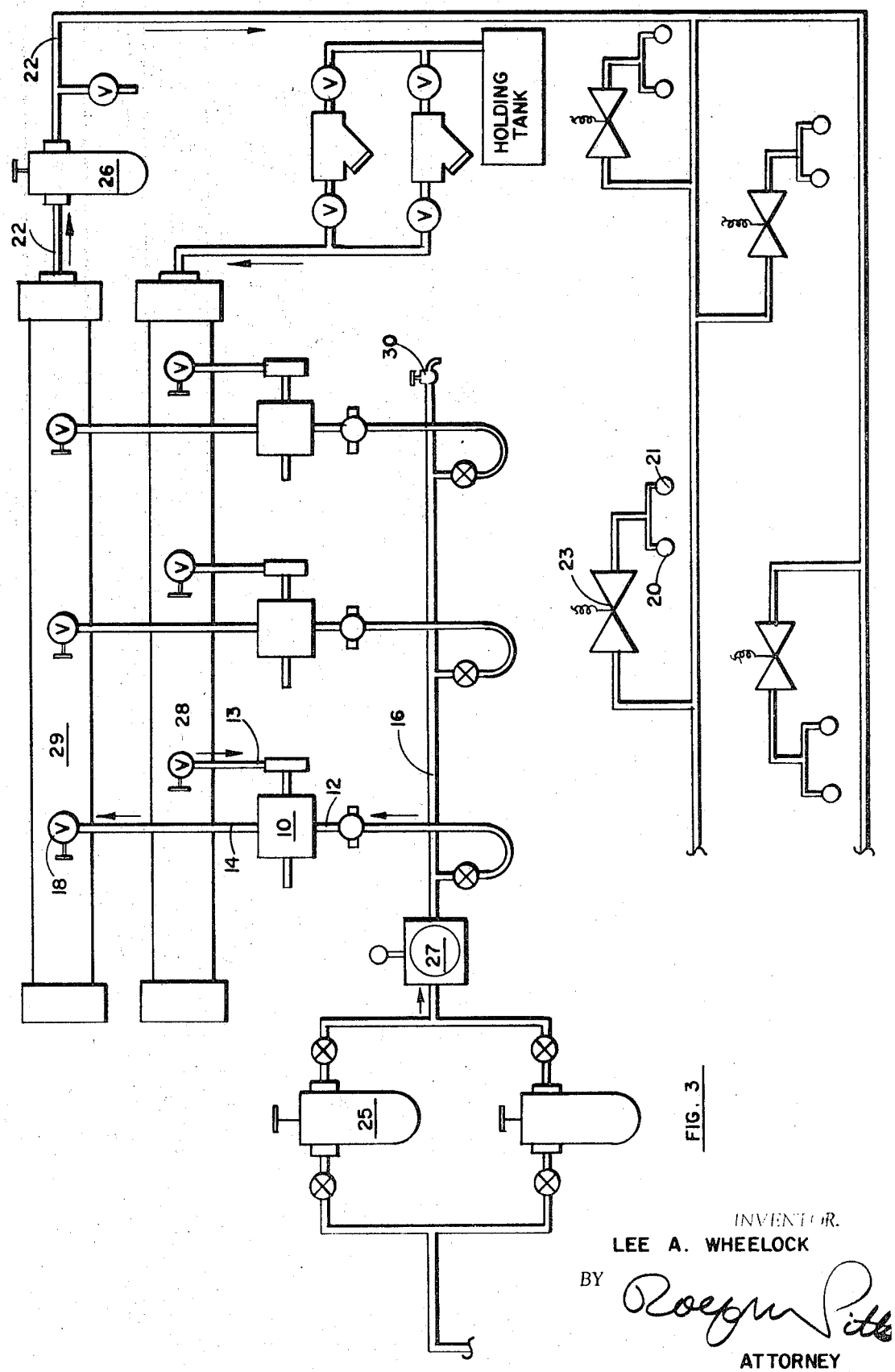
FIG. 3 is a perspective view of a set of lubricating nozzles installed in place for lubricating a chain link type conveyor.

There is also provided in the arrangement of FIG. 1 a pair of nozzles 20 and 21 for spraying a conical shaped spray in response to the application of a pressurized water source. A suitable water spray is provided by a nozzle having an aperture or orifice of nominally 0.015 inch in diameter, with ranges of 0.014—017 inch having been successfully employed, each nozzle being oriented downwardly and located vertically above a respective chain of a chain link type conveyor, as shown more particularly in FIG. 3. As illustrated in FIG. 3, each of cone jet type nozzles 20 and 21 is mounted and oriented in a bracket or adapter plate 29 so as to direct a spray of lubricant upon a respective one of a plurality of conveyor chains 30 therebeneath. Such cone jet type nozzles are commercially available from Spraying Systems Co. of Bellwood, Illinois. Chemically inert piping means 19 is preferably employed in the system of FIG. 1 to couple the nozzles in fluid circuit with the output manifold 17. In other words, such piping is chemically stable or inert in the presence of the lubricating mixture as to neither be affected by such mixture nor to disturb the titration reading of the mixture itself. A suitable material for such piping means if polyvinyl chloride.

There is further provided in FIG. 1 a solenoid-actuated shutoff valve 23 interposed in series fluid circuit with nozzles 20 and 21, and including a switch (not shown) responsive to motion of a conveyor with which it is intended to cooperate, for automatically shutting off fluid flow to the nozzles 20 and 21 when such motion ceases. In this way, unnecessary lubrication of a particular conveyor is avoided and lubricant is conserved. Where lubrication of no more than one conveyor is involved, the use of a solenoid shutoff valve to shutoff fluid communication between the proportioning pump and all the nozzles associated with the single conveyor, also serves to prevent fluid flow of pressurized water through the pump in the same manner as the manually operated shutoff valve, resulting in shutting off the pump.

In normal operation of the above-described arrangement, the water-miscible liquid lubricant employed is one of a commercially available grade such as a product under the name "Lube Rite 30" manufactured by Chemco Co. of Long Beach, California. The proportioning adjustment of the proportioning pump is adjusted to provide a desired mixture of lubricant and water by volume and corresponding to a preselected titration reading specified by the lubricant manufacturer. The process of making such a titration reading may be facilitated by the inclusion of a petcock 24 or the like at the output of the pump for drawing off samples of the mixture for such purposes.

The ratio of water to lubricant is normally quite high, and may vary from 75 to 150 parts of water to one part of lubricant, depending upon the specifications for a given manufacturer's lubricant. Because of such high ratio, purity of the water supply may affect titration readings employed to accurately measure the ratio. In order that variations in the chemical purity of the pressurized water supply not adversely affect the indicated ratio provided by the titration readings, it is preferable that the fresh water supply be treated or softened to limit the hardness thereof to six grains maximum, by means well understood in the water treatment art. Additionally, in view of the small apertures employed by the lubricating nozzles, it is desirable to include filters 25 and 26, corresponding to 0.0035 diameter fineness or spacing, for filtering the pressurized water input to the pumps and the mixed outputs thereof.

During normal operation of the above described arrangement, each nozzle delivers about 0.6 gallons of lubricant spray per hour, which may be satisfactorily supplied under a water supply pressure between 1 to 85 pounds per square inch guage. However, more uniform results may be expected where a pressure regulator 27 is included and located downstream of the water main filter 25 and adjusted for providing a nominal pressure of 35 pounds per square inch guage.

Although ¼-inch lines are adequate between the solenoid shutoff valve and its associated nozzles, it is preferable that larger size piping be employed between such solenoid shutoff valve and the remotely located proportioning pumps, in order to reduce the pressure head loss contributed by such piping means.

Currently available commercial proportioning pumps can adequately supply 300 nozzles per pump, for supporting a nozzle delivering of 0.6 gallons per hour under a supply water pressure of 35 pounds per square inch. Where a greater number of nozzles is involved, due to a larger number of conveyors to be lubricated, several pumps may be employed in parallel, as shown in FIG. 2.

Figure 2:
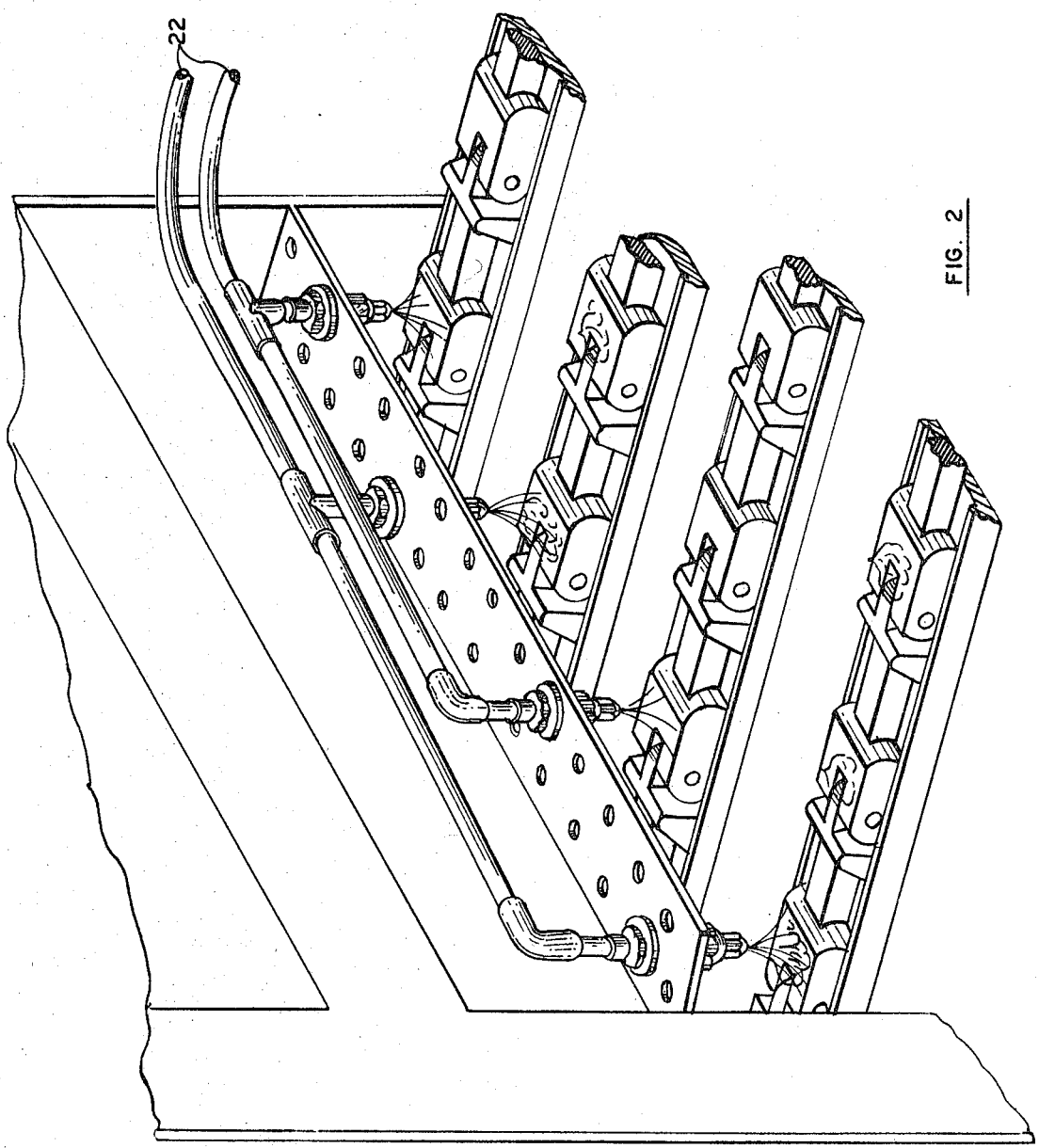
FIG. 2 is a schematic diagram of an alternate embodiment of the invention.

Referring to FIG. 2, there is illustrated a schematic arrangement of a plurality of proportioning pumps arranged in parallel fluid circuit for supplying a selected mixture of water and lubricant to several sets of lubricating nozzles, each set controlled by a separate solenoid valve and corresponding to a separate conveyor to be lubricated. In such arrangement, there is provided a first chemically inert reservoir means 28 having an input adapted to be coupled to a source of lubricant, and further having a plurality of outputs, each output being connected in fluid circuit to the second, or proportioning input of a mutually exclusive one of pumps 10.

There is also provided a second chemically inert reservoir 29 having a plurality of inputs, each input coupled to an output of a mutually exclusive one of pumps 10, and further having an output coupled in fluid circuit with the output filter 26.

Each of reservoirs 28 and 29 are similarly constructed and arranged and comprises a manifold having an inside diameter substantially larger than that of the piping means with which it is interposed in fluid circuit, one end of the manifold being closed and a second end thereof forming a common port, the common port of manifold 28 being adapted to be coupled to a source of lubricant and the common port of manifold 29 being coupled in fluid circuit to piping means 22. Axially spaced apertures along manifolds 28 and 29, respectively, comprise ports coupled to mutually exclusive ones of the first input ports and output ports, respectively, of the pumps 10. The ratio of the inside diameter of the manifold to that of an associated piping means is preferrably at least three, although other ratios may be used.

In normal operation of the arrangement of FIG. 2, the reservoirs 28 and 29 tend to reduce the pressure and flow effects of alternative pumps being placed in or taken out of service or the shutting-off and on of one or some of the sets of nozzles by the associated solenoid shutoff valves, in responses to shutdown and start up of the conveyors associated therewith. A 2-inch wide diameter manifold may cooperate with a ¾-inch pipe line, such as the line size connecting manifold 29 to the solenoid shutoff valves, while a ¼-inch line may be used to connect the nozzles to a respective solenoid shutoff valve.

The limited range of speeds at which the conveyors are usually operated will not substantially effect the lubrication requirements. If the speed of a conveyor is increased, a given lubrication point or load-bearing surface on the conveyor is merely passing the nozzles more frequently, and more feet of chain link are exposed for lubrication in a given time interval. A more significant factor effecting lubrication is the spacing interval between and location of nozzles along a working length of chain link. In an endless chain link type conveyor, that portion of the loop of chain link which is intended to convey or transport goods or otherwise bear a load is referred to as the working length thereof. It has been found preferable to locate a nozzle at the beginning of the working length. Where the conveyor is reversible, nozzles should preferrably be placed at opposite ends of the working length for working lengths of chain of as much as 60 feet, while for working lengths greater than 60 feet, say as much as two hundred feet, an intermediate nozzle installation may also be preferred.

Accordingly, there has been described means for automatically and efficiently lubricating a chain link conveyor with a metered amount of water-miscible lubricant, whereby wear and tear on such conveyors may be economically avoided.

Although the invention has been described and illustrated in detail, it is clearly to be understood that the same is by way of example only, and not by way of limitation, the spirit and scope of the invention being limited only by the terms of the appended claims.

I claim:

1. In cooperation with a chain link type conveyor, apparatus for automatic lubrication of said conveyor and comprising:
   a source of water-miscible lubricant;
   a pressurized source of water;
   at least one adjustable fluid pressure-driven mixing pump responsive to said pressurized source of water and coupled to said source of lubricant for providing an output mixture of lubricant and water in a preselected ratio by volume and corresponding to a specified titration;
   at least one pair of conical-spray type nozzles, each nozzle having an outlet aperture of approximately 0.015 inch and oriented downwardly and located vertically above a respective one of the chains of said conveyor by a distance within the range of one-half inch to three inches;
   chemically inert piping means coupling said nozzles in fluid circuit with the mixed output of said pump; and
   shutoff valve means in series fluid circuit with said pair of nozzles and responsive to motion of said conveyor for shutting-off fluid flow to said nozzles when said motion ceases.

2. In cooperation with a chain link type conveyor system, apparatus for automatic lubrication of a plurality of chain link type conveyors and comprising:
   at least one adjustable fluid pressure-driven mixing pump means having a first input and a second input adapted to be respectively coupled to a respective one of a pressurized source of water and a source of a water-miscible lubricant for providing an output mixture of lubricant and water of a selected ratio by volume and corresponding to a preselected titration reading;
   at least one pair of conical-spray type nozzles per conveyor, each nozzle having an outlet aperture of substantially 0.015 inch and oriented downwardly and located vertically above a respective chain of said chain link type conveyor by a distance of within the range of one-half inch to three inches;

chemically inert piping means coupling each said pair of nozzles in fluid circuit with the mixed output of said pump means; and a like number of solenoid-operated shutoff valves as the number of conveyors, each valve commonly in series fluid circuit with those pairs of nozzles associated with a mutually exclusive one of said conveyors and responsive to motion of said one conveyor for shutting-off fluid flow to said associated pairs of nozzles.

3. The device of claim 2 in which a nozzle is located at an end of a working length of each chain of said conveyor.

4. The device of claim 2 in which a nozzle is located at each end of a working length of each chain of said conveyor.

5. In cooperation with a chain link type conveyor, apparatus for automatic lubrication of said conveyor and comprising:

a source of water-miscible lubricant;

a pressurized source of water, pressurized within a pressure range between 1 p.s.i. and 85 p.s.i.;

at least one adjustable fluid pressure-driven mixing pump responsive to said pressurized source of water and coupled to said source of lubricant for providing an output mixture of lubricant and water in a preselected ratio by volume and corresponding to a specified titration;

at least one pair of conical-spray type nozzles, each nozzle having an outlet aperture of approximately 0.015 inch and oriented downwardly and located vertically above a respective one of the chains of said conveyor by a distance within the range of one-half inch to three inches;

chemically inert piping means coupling said nozzles in fluid circuit with the mixed output of said pump, the cross section of said piping means being larger at an end coupled to said pump than at the end coupled to said nozzles; and shutoff valve means in series fluid circuit with said pair of nozzles and responsive to motion of said conveyor for shutting-off fluid flow to said nozzles when said motion ceases.

6. In cooperation with a chain link type conveyor system, apparatus for automatic lubrication of a plurality of chain link type conveyors and comprising:

at least one adjustable fluid pressure-driven mixing pump means having a first input and a second input adapted to be respectively coupled to a respective one of a pressurized source of water and a source of a water-miscible lubricant for providing an output mixture of lubricant and water of a selected ratio by volume and corresponding to a preselected titration reading, said pumping means comprising a plurality of fluid pressure-driven pumps, each pump having a first input commonly connected to a pressurized source of water and further having a second input and a commonly connected output; and in which there is further provided chemically inert reservoir means having an input adapted to be coupled to a source of a water-miscible lubricant and a plurality of outputs, each output of said first reservoir being connected to the second input of a mutually exclusive one of said pumps;

at least one pair of conical-spray type nozzles per conveyor, each nozzle having an outlet aperture of substantially 0.015 inch and oriented downwardly and located vertically above a respective chain of said chain link type conveyor by a distance of within the range of one-half inch to three inches;

chemically inert piping means coupling each said pair of nozzles in fluid circuit with the mixed output of said pump means; and a like number of solenoid-operated shutoff valves as conveyors, each valve commonly in series fluid circuit with those pairs of nozzles associated with a mutually exclusive one of said conveyors and responsive to motion of said one conveyor for shutting-off fluid flow to said associated pairs of nozzles.

7. In cooperation with a chain link type conveyor system, apparatus for automatic lubrication of a plurality of chain link type conveyors and comprising:

at least one adjustable fluid pressure-driven mixing pump means having a first input and a second input adapted to be respectively coupled to a respective one of a pressurized source of water and a source of a water-miscible lubricant for providing an output mixture of lubricant and water of a selected ratio by volume and corresponding to a preselected titration reading, said pumping means comprising a plurality of fluid pressure-driven pumps, each pump having a first input commonly connected to a pressurized source of water and a commonly connected second input and further having an output; and in which there is further provided chemically inert reservoir means having a plurality of inputs, each input of said reservoir being connected in fluid circuit to an output of a mutually exclusive one of said pumps, and further having an output coupled in fluid circuit with said piping means;

at least one pair of conical-spray type nozzles per conveyor, each nozzle having an outlet aperture of substantially 0.015 inch and oriented downwardly and located vertically above a respective chain of said chain link type conveyor by a distance of within the range of one-half inch to three inches;

chemically inert piping means coupling each said pair of nozzles in fluid circuit with the mixed output of said pump means; and a like number of solenoid-operated shutoff valves as conveyors, each valve commonly in series fluid circuit with those pairs of nozzles associated with a mutually exclusive one of said conveyors and responsive to motion of said one conveyor for shutting-off fluid flow to said associated pairs of nozzles.

8. The device of claim 7 in which there is further provided second reservoir means interposed in fluid circuit between said second inputs of said pumps and a common connection of said second inputs.

9. The device of claim 8 in which each said reservoir means comprises a manifold having an inside diameter substantially larger than that of the piping means with which it is interposed in fluid circuit, one axial end of said manifold being closed, a second end forming a common port, and a plurality of axially spaced apertures being formed in said manifold as ports for fluid communication with respective ones of said pumps.

10. The device of claim 7 in which said reservoir means comprises a manifold having an inside diameter substantially larger than that of said piping means, one axial end of said manifold being closed, a second end forming an output port coupled in series fluid circuit with said piping means and a plurality of axially-spaced apertures being formed in said manifold as input ports coupling said manifold in fluid communication with respective ones of the outputs of said pumps.

11. The device of claim 9 in which the ratio of the inside diameter of said manifold means is at least three times that of said piping means.